Oct. 15, 1940.                G. J. REINITZ                2,218,096
                           STARCHING MACHINE
             Original Filed Feb. 23, 1938      2 Sheets-Sheet 1
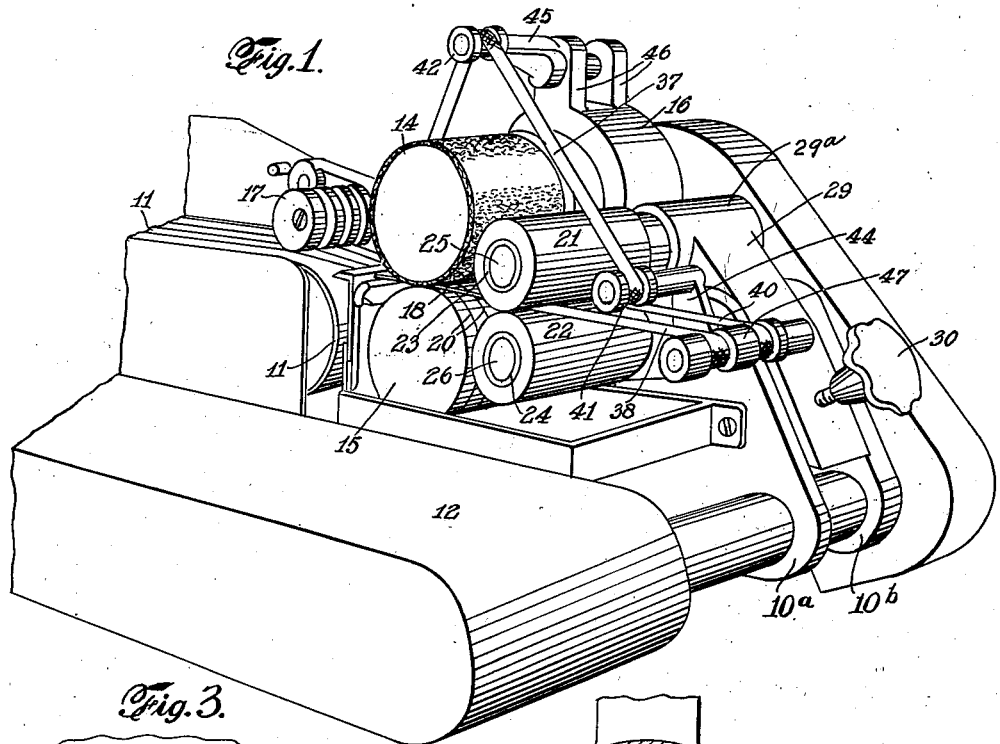
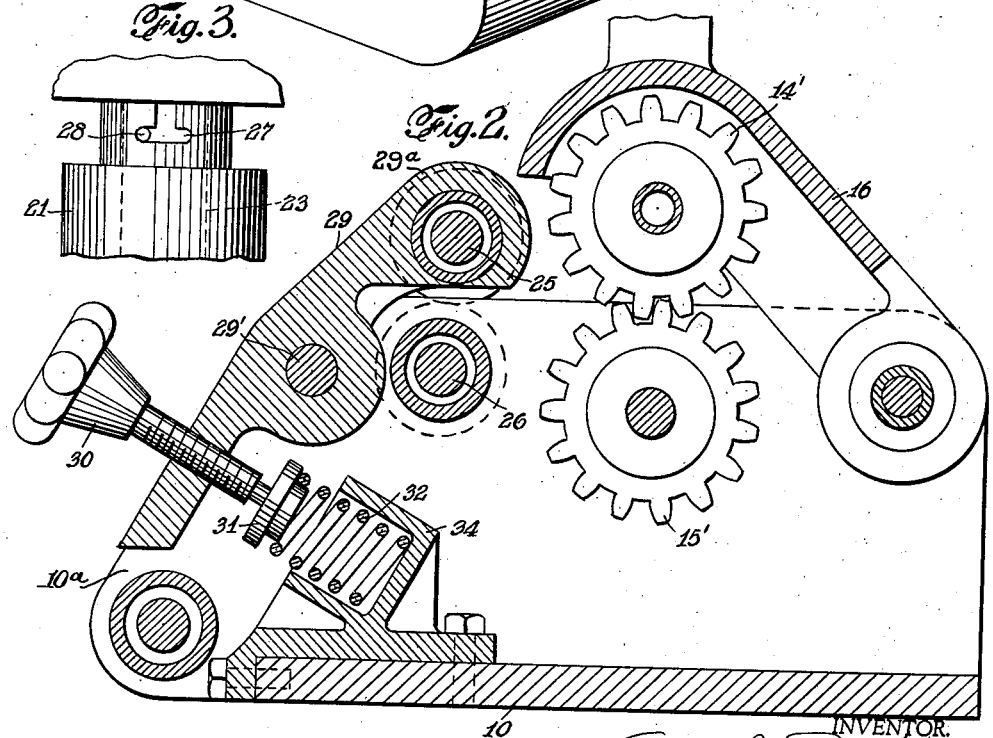

Oct. 15, 1940.    G. J. REINITZ    2,218,096
STARCHING MACHINE
Original Filed Feb. 23, 1938    2 Sheets-Sheet 2
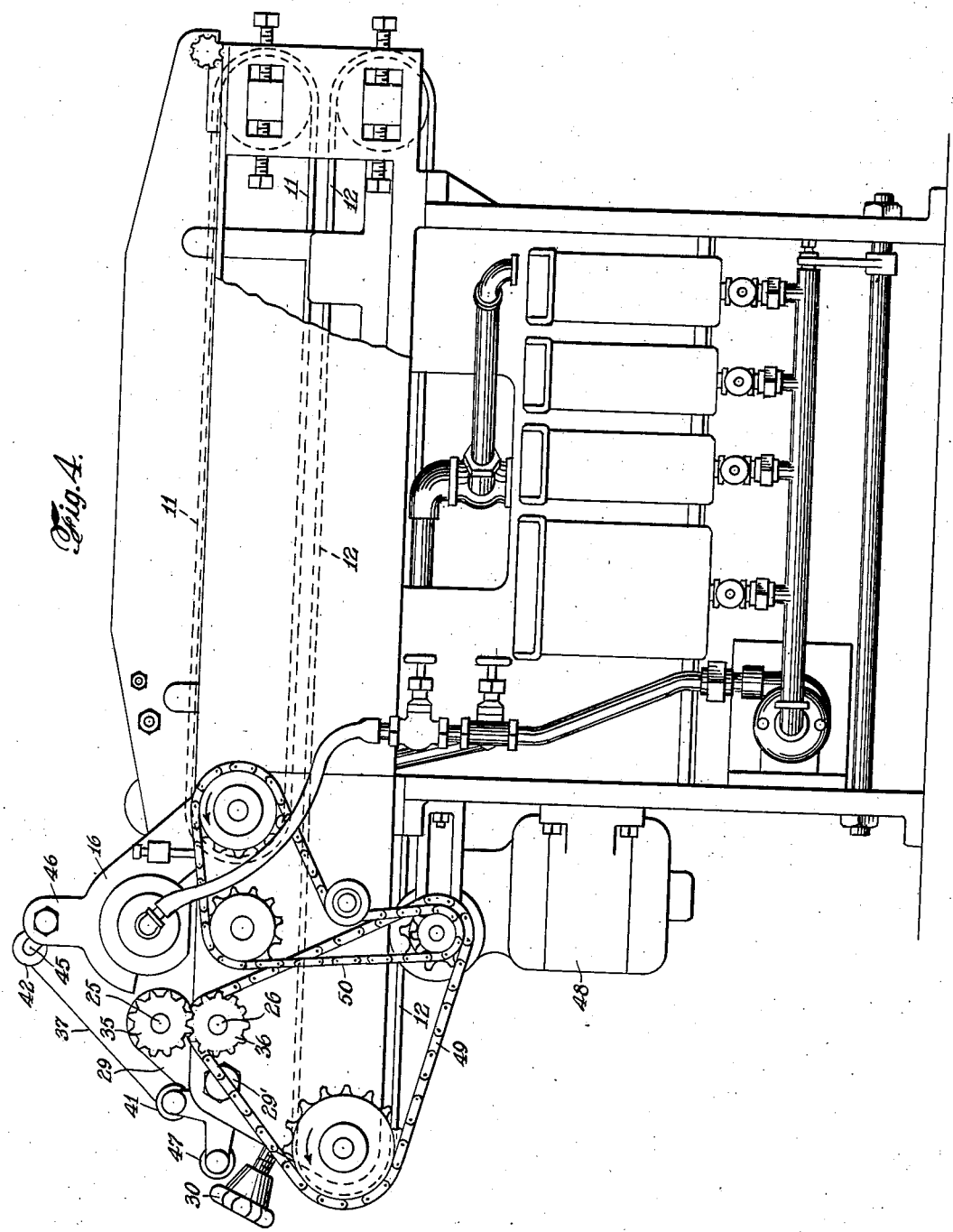
INVENTOR.
George J. Reinitz
BY Williams, Rich & Morse
ATTORNEYS Patented Oct. 15, 1940

2,218,096

UNITED STATES PATENT OFFICE 2,218,096

STARCHING MACHINE

George J. Reinitz, Brooklyn, N. Y., assignor to United Laundry Machinery Corporation, New York, N. Y., a corporation of New York Original application February 23, 1938, Serial No. 191,928. Divided and this application December 3, 1938, Serial No. 243,715

1 Claim. (Cl. 68—262)

This invention relates to starch-extracting mechanism such as is shown and described in my copending patent application Serial No. 191,928, filed February 23, 1938, of which the present application is a division.

In carrying out starching operations with the machine shown and described in my above-mentioned copending application, starch is initially applied to the laundered articles one after another in excess of the amount required, and immediately pursuant to the respective starching operations the excess starch is removed by the starch-extracting mechanism shown, described and claimed herein.

An important object of the present invention is to provide an improved starch-extracting mechanism which is simple in construction and is especially adapted for use in machines designed particularly to enable starching operations to be carried out with reference to certain parts of laundered articles to the exclusion of the other parts thereof, as for example in the case of collar-attached shirts where it is desired to starch only the collar, neckband, cuffs and bosom of the respective garments.

Other objects and advantages of the invention will become apparent from the following description when taken in connection with the accompanying drawings which illustrate only so much of a starching machine of the above character as is necessary to a complete disclosure of the present invention.

In the drawings, Fig. 1 is a perspective view of the delivery end of a starching machine in which is incorporated a starch-extracting mechanism embodying the present invention; Fig. 2 is a central vertical longitudinal sectional view showing in detail means for adjusting the pressure of the extracting rolls; Fig. 3 is a detailed view showing means by which the extracting rolls are removably secured to their respective shafts; and Fig. 4 is a rear elevation of the entire machine showing parts of the extracting mechanism at the left end thereof and the driving mechanism therefor.

The starching machine which is herein only fragmentally illustrated and in which the present invention is incorporated includes a suitable frame structure, a portion of which is indicated by the numeral 10, on which is supported a transporting mechanism, including a pair of endless conveyors 11 and 12 which function conjointly to deliver articles to a starching mechanism which includes a pair of starch-applying rolls 14 and 15 between which are passed such parts of laundered articles as are to be starched. These starching rolls 14 and 15 are, under normal operating conditions, connected together by a pair of gears 14' and 15' having positive connections with the respective rolls, the former of which is yieldably supported with respect to the latter through the medium of a pivotally supported carrier 16. Positive delivery of articles from the endless conveyor 11 to the starching rolls 14 and 15 is facilitated by the presence of a roller 17, yieldably supported with relation to the delivery end of the conveyor 11 and adapted to cooperate with a plurality of small rods 18 suitably anchored in front of the starching rollers between which they extend, the rods being accommodated within grooves 20 provided in the lower roll.

As the articles pass from between the starching rolls 14 and 15, they move on the rods 18 to the extracting mechanism which embodies the present invention and which includes a pair of extracting rolls 21 and 22 made of rubber molded on metal sleeves 23 and 24 which, as shown in Fig. 3, are removably secured on shafts 25 and 26 by double-ended slots 27 which engage with pins 28 in the shafts. This enables the rolls 21 and 22 to be locked on their shafts for rotation in either direction and makes them interchangeable on the shafts 25 and 26.

To produce just the proper degree of dryness to make the starched articles ready for pressing, it is necessary to provide means for adjusting the pressure of the extracting rolls 21 and 22. To produce uniform dryness, it is also necessary that the extracting rolls be maintained parallel throughout the range of adjustment. These two requirements have been met by the construction shown in detail in Figs. 1 and 2. The lower extracting roll shaft 26 is mounted in fixed bearings in the frame structure 10 and supported wholly from one end thereof. The upper extracting roll shaft 25 is also supported wholly from one end thereof, it being mounted in a pair of bearings in the end of a lever arm 29 which is pivoted at about its midpoint on a fixed shaft 29' supported by the frame structure 10. The pressure adjustment is effected by a hand screw 30 which bears against a cap 31 in the end of a coil spring 32. This spring is held in a retainer 34 bolted to the frame structure 10. By adjusting the tension of the spring 32, a yielding pressure in any desired amount may be had.

As best shown in Fig. 1, it will be seen that the sides 10a and 10b of the frame 10 are spaced apart. The bearings for the shaft 26 are secured one in side 10a and the other in side 10b, which gives a very rigid support for the lower extractor roll 22. The lever arm 29 is disposed in the space between the sides 10a and 10b. The shaft 29' upon which it pivots is likewise supported at either end in the two sides. The head 29a of lever 29 is elongated so that the bearings for shaft 25 may be spaced at least as far apart as the bearings for shaft 26. This construction provides sufficient rigidity to maintain the extracting rolls 21 and 22 parallel throughout the range of pressures desired, while supporting the rolls from only one side.

To further facilitate positive and automatic delivery of articles from the starching rolls 14, 15 to the extracting rolls 21, 22 and away from the latter, there are provided a plurality of endless tapes 37, 38, 40 which are cooperatively associated with these rolls. The tape 37 passes between the starching rolls 14, 15, between the extracting rolls 21, 22, around a guide roll 41 and up over a tension roll 42, the guide roll being carried by an adjustable arm 44, suitably connected, as by pivot means not shown, to the frame structure 10, and the tension roll 42 being mounted on the end of an eccentric shaft 45 supported for rotative adjustment in lugs 46 on the top of the carrier 16 so as to enable the tape to be loosened or tightened as required. The tapes 38, 40 pass around the lower extracting roll 22 and around a guiding and tension-adjusting roll 47 carried by the adjustable arm 44. As articles pass from between the extracting rolls 21, 22, their positive and automatic delivery from the machine is effected by reason of the fact that they are engaged by the lower reach of the upper tape 37 and the upper reaches of the lower tapes 38, 40.

As shown in Fig. 4, on the rear end of the extracting roll shafts 25 and 26 are intermeshing gears 35 and 36, so that such rolls, like the starching rolls 14 and 15, may be positively rotated in opposite directions, by means of any suitable mechanism such as an electric motor 48 driving suitable power transmission means such as the chains 49, 50 for driving the endless conveyors 11, 12, the starching rolls 14, 15, and the extracting rolls 21, 22 in a synchronized or properly timed relation.

While the foregoing description of an embodiment of the invention has been given in considerable detail to enable one to practice the invention, it is not intended to limit the invention to such details inasmuch as many modifications may be made therein within the purview of the invention as defined in the appended claim.

What is claimed is:

In a starching machine including a pair of extracting rolls wherein after starch has been applied to part of a garment in excess of the amount required that excess is removed by passing the starched part of the garment between the extracting rolls which have their bearings only at one side, means for supporting and adjusting the pressure between said rolls for regulating the amount of starch removed without affecting the alignment of the rolls comprising a rigid frame having spaced sides, a fixed mounting for one of said rolls including a first shaft rotatably mounted wholly at one side of the roll in bearings supported by said spaced sides, a lever disposed between said sides and pivotally mounted therein between its ends, a second shaft rotatably mounted wholly in one end of said lever parallel to said first shaft and supporting the other extracting roll from only one side, resilient means rigidly supported by said frame, and a manually adjustable connection between said means and the other end of said lever operable to regulate the pressure between the extracting rolls.

GEORGE J. REINITZ.